UNITED STATES PATENT OFFICE.

OTTO DEGNER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

COMPOUND OF SILVER AND FORMONUCLEINIC ACID.

No. 852,545.

Specification of Letters Patent.

Patented May 7, 1907.

Application filed April 17, 1906. Serial No. 312,176.

*To all whom it may concern:*

Be it known that I, OTTO DEGNER, doctor of philosophy, chemist, a citizen of the German Empire, residing at Elberfeld, Germany, Kingdom of Prussia, have invented new and useful Improvements in Compounds of Silver and Formonucleinic Acids, of which the following is a specification.

My invention relates to the production of new soluble compounds of formonucleinic acids and silver. The process for the preparation of these bodies consists in treating the insoluble silver compounds of formonucleinic acids or salts thereof with neutral-salt solutions.

Under the expression "formonucleinic acids" I understand the products which are obtained by the action of formic aldehyde on nucleinic acids of animal or vegetable origin, as they are obtained *e. g.* from yeast, sperm, thymus etc. The preparation of these formonucleinic acids is described in British Letters Patent 11882 of 1902.

The new silver compounds are of high percentage. They contain more than 10 per cent. of silver *e. g.* from 15 to 25 per cent. They are, when dry and pulverized, yellowish powders soluble in water with a yellowish brown color and insoluble in either and benzene. They contain the silver so firmly combined with the formonucleinic acid molecule that on adding a diluted solution of caustic soda lye or a solution of common salt to the aqueous solution of the new silver compounds no precipitate is obtained. The new products possess valuable therapeutic properties as antiseptics and their freedom from irritation renders their outward application highly satisfactory. A solution of from 2 to 3 per cent. may be used for external application.

In carrying out my new process practically I can proceed as follows, the parts being by weight:

Example 1. 40 parts of silver nitrate dissolved in water are stirred into a solution of 100 parts of the sodium salt of formonucleinic acid from yeast in 300 parts of water. A voluminous precipitate is obtained to which a saturated solution of common salt is slowly added until a clear solution results. The soluble silver compound thus obtained is separated from its solution by the addition of alcohol, filtered off, washed several times with alcohol and dried *in vacuo*. It is a yellowish-white powder having the above mentioned properties and containing about 22 per cent. of silver.

Example 2. 100 parts of the sodium salt of the formo-nucleinic acid from yeast are dissolved in 300 parts of water, and to this solution 30 parts of silver nitrate, dissolved in water, are added with stirring. A voluminous precipitate is obtained to which a saturated solution of common salt is slowly added until a clear solution results. The soluble silver compound thus obtained is separated from the solution by the addition of alcohol, filtered off, washed several times with alcohol, and dried *in vacuo*. It is a yellowish-white powder, having the above-mentioned properties, and containing about 15% of silver.

Example 3. 100 parts of the sodium salt of the formonucleinic acid from yeast are dissolved in 300 parts of water, and to this solution 45 parts of silver nitrate, dissolved in water, are added with stirring. A voluminous precipitate is obtained to which a saturated solution of common salt is slowly added until a clear solution results. The soluble silver compound thus obtained is separated from the solution by the addition of alcohol, filtered off, washed several times with alcohol, and dried *in vacuo*. It is a yellowish-white powder, having the above-mentioned properties, and containing about 25% of silver.

The process is carried out in an analogous manner on starting from formonucleinic acids prepared from nucleinic acids of any other origin or on using other neutral-salt solutions, such as solutions of sodium acetate, sodium nitrate, potassium chlorid etc.

Having now described my invention and in what manner the same is to be performed, what I claim as new and desire to secure by Letters Patent is:—

1. The herein-described new silver compounds of formonucleinic acids containing from 15 to 25 per cent. of silver obtainable by the action of neutral-salt solutions on the insoluble silver compounds of formonucleinic acids, which new silver compounds are, when dry and pulverized, yellowish powders soluble in water with a yellowish-brown color, insoluble in ether and benzene, and containing the silver so firmly combined with the formonucleinic acid that the aqueous solutions do not give any precipitate on the addition of dilute caustic soda lye or a solution of common salt; and being valuable antiseptics, substantially as described.

2. The herein-described new specific silver compound of formonucleinic acid from yeast containing about 22 per cent. of silver, obtainable by the action of a common salt solution on the insoluble silver compound of formonucleinic acid from yeast, which new silver compound is, when dry and pulverized, a yellowish powder soluble in water with a yellowish-brown color, insoluble in ether and benzene, and containing the silver so firmly combined with the formonucleinic acid molecule that the aqueous solution does not give any precipitate on the addition of dilute caustic soda lye or a solution of common salt; and being a valuable antiseptic, substantially as described.

In testimony whereof I have hereunto set my hand in the presence of two subscribing witnesses.

OTTO DEGNER.

Witnesses:
   OTTO KÖNIG,
   ARTHUR MATTHÄWS.